United States Patent
Perrin et al.

(10) Patent No.: US 9,639,767 B2
(45) Date of Patent: May 2, 2017

(54) CONTEXT-AWARE HANDWRITING RECOGNITION FOR APPLICATION INPUT FIELDS

(71) Applicant: LENOVO (Singapore) PTE, LTD., New Tech Park (SG)

(72) Inventors: Steven Richard Perrin, Raleigh, NC (US); Scott Edwards Kelso, Cary, NC (US); John Weldon Nicholson, Cary, NC (US); Jianbang Zhang, Raleigh, NC (US)

(73) Assignee: Lenovo (Singapore) PTE. LTD., Tech Park (SG)

( * ) Notice: Subject to any disclaimer, the term of this patent is extended or adjusted under 35 U.S.C. 154(b) by 91 days.

(21) Appl. No.: 14/328,196

(22) Filed: Jul. 10, 2014

(65) Prior Publication Data

US 2016/0012315 A1 Jan. 14, 2016

(51) Int. Cl.
*G06K 9/62* (2006.01)
*G06K 9/20* (2006.01)
*G06K 9/00* (2006.01)

(52) U.S. Cl.
CPC ....... *G06K 9/2063* (2013.01); *G06K 9/00409* (2013.01); *G06K 2209/01* (2013.01)

(58) Field of Classification Search
CPC ........... G06K 2209/01; G06K 9/00409; G06K 9/2063

USPC ........................................................ 382/161
See application file for complete search history.

(56) References Cited

U.S. PATENT DOCUMENTS

| 8,306,993 | B2* | 11/2012 | Hedloy | G06F 17/30067 707/767 |
| 2002/0156846 | A1* | 10/2002 | Rawat | G06F 17/243 709/203 |
| 2007/0168382 | A1* | 7/2007 | Tillberg | G06F 17/30253 |
| 2012/0226490 | A1* | 9/2012 | Mashiah | G06F 3/0237 704/8 |

* cited by examiner

*Primary Examiner* — Manuchehr Rahmjoo
(74) *Attorney, Agent, or Firm* — Kunzler Law Group

(57) ABSTRACT

For context-aware handwriting recognition for input fields, an apparatus, system, method, and computer program product are disclosed. The apparatus may include a processor, a handwriting input unit operatively coupled to the processor, a display operatively coupled to the processor, a field metadata module that obtains metadata related to an input field, a field type module that identifies a field type of the input field associated with the handwriting input based on the metadata, and a recognition tuning module that adjusts a handwriting recognition engine based on the field type. Adjusting the handwriting recognition engine may include increasing a weight given to text having particular characteristics, based on the field type. Obtaining the metadata related to an input field may include querying an application for properties of the input field and/or identifying text adjacent to the input field.

20 Claims, 6 Drawing Sheets

CONTEXT-AWARE HANDWRITING RECOGNITION FOR APPLICATION INPUT FIELDS

FIELD

The subject matter disclosed herein relates to handwriting recognition and more particularly relates to context-aware handwriting recognition for input fields.

BACKGROUND

Description of the Related Art

Touchscreen devices are popular and widely sold. Smartphones, tablet computers, and other touchscreen devices often lack a physical keyboard for textual input. As such, handwriting recognition software is gaining popularity as a way to input text into a touchscreen device. Handwriting recognition engines are configured to achieve greatest accuracy when recognizing prose. However, recognition accuracy decreases in situations where text is constrained by rules that generally do not apply to prose.

BRIEF SUMMARY

An apparatus for context-aware handwriting recognition for input fields is disclosed. A method and computer program product also perform the functions of the apparatus.

The apparatus may include a processor, a handwriting input unit operatively coupled to the processor, a display operatively coupled to the processor, a field metadata module that obtains metadata related to an input field, a field type module that identifies a field type of the input field associated with the handwriting input based on the metadata, and a recognition tuning module that adjusts a handwriting recognition engine based on the field type. Adjusting the handwriting recognition engine may include increasing a weight given to text having particular characteristics, based on the field type. Obtaining the metadata related to an input field may include querying an application for properties of the input field and/or identifying text adjacent to the input field.

In certain embodiments, the apparatus includes a field property module that queries an application for properties of the input field and provides results of the query as metadata to the field metadata module. In certain embodiments, the apparatus includes a field text module that identifies text adjacent to the input field and provides the text as metadata to the field metadata module. In certain embodiments, the apparatus includes a suggestion module that provides input suggestion based on a contacts database in response to the field type module identifying an input field type selected from the group consisting of: an email address field, an address field, a telephone number field, and a uniform resource locator field.

In certain embodiments, the apparatus includes an association module that associates the handwriting input with a particular input field based on a field type of the particular input field. The association module identifies a plurality of input fields near a location of the handwriting input and associates the handwriting input with an input field having a field type related to content of the handwriting input.

In certain embodiments, the apparatus includes an association module that associates the handwriting input with a particular input field based on a location of the handwriting input. In some embodiments, the association module identifies the location of the handwriting input, calculates distances between the location of the handwriting input and a plurality of input fields, and associates the handwriting input with a nearest one of the plurality of input fields. In some embodiments, the association module identifies a plurality of input fields that are located within a predetermined distance of each other, analyzes content of the handwriting input, and selects one of the plurality of input fields based on the content of the handwriting input.

The method may include receiving, by use of a processor, handwriting input, identifying a field type of an input field associated with the handwriting input, and adjusting a handwriting recognition engine based on the field type. Adjusting a handwriting recognition engine based on the field type may include increasing a weight given by the handwriting recognition engine to text having properties associated with the field type.

In certain embodiments, the method includes obtaining metadata related to the input field, wherein identifying the field type of the input field includes identifying the field type based on the metadata. Obtaining metadata related to the input field may include querying an application for properties of the input field and/or identifying text adjacent to the input field.

In certain embodiments, the method includes comparing content of the handwriting input to the input field type and associating the handwriting input with another input field in response to the content not matching the input field type. In some embodiments, the method includes comparing a distance between the location of handwriting input and the position of the input field to a predetermined threshold and associating the handwriting input with another input field in response to the distance exceeding the predetermined threshold. In other embodiments, the method also includes calculating distances between the location of handwriting input and positions of a plurality of input fields and associating the handwriting input with another input field in response to the distance exceeding the predetermined threshold.

The computer program product may include a computer readable storage medium that stores code executable by a processor to perform: receiving handwriting input for a password field, obtaining metadata related to an input field, identifying a field type of the input field associated with the handwriting input based on the metadata, and adjusting a handwriting recognition engine based on the field type. Adjusting the handwriting recognition engine based on the field type may include increasing a weight given by the handwriting recognition engine to text having particular characteristics based on the field type. In certain embodiments, the computer program product includes code to perform determining whether the handwriting input is associated with the input field based on a location of the handwriting input.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
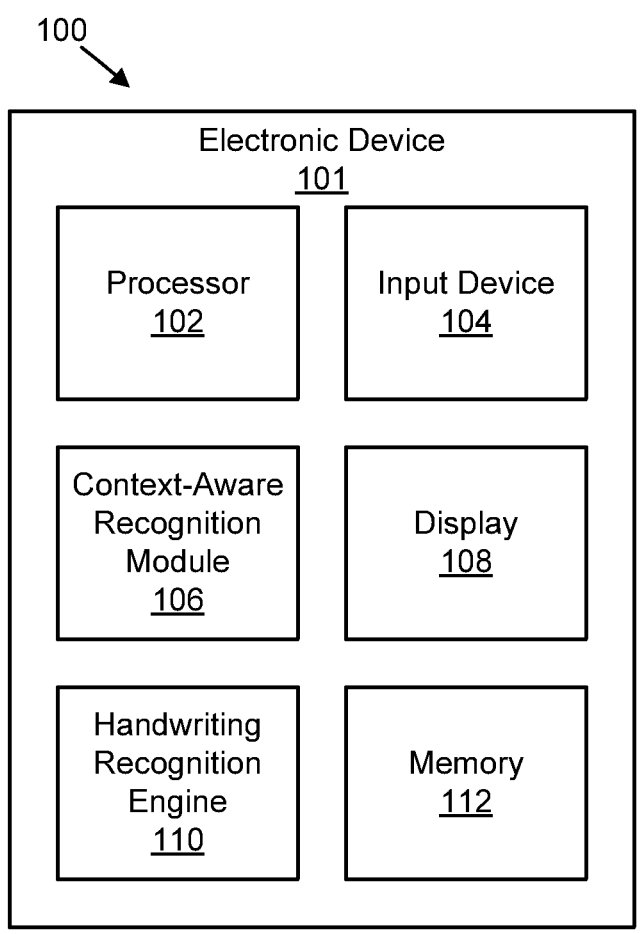
FIG. 1 is a schematic block diagram illustrating one embodiment of a system for context-aware handwriting recognition.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed systems, apparatuses, methods, and computer program products obtain metadata relating to an input field associated with a handwriting input, identify a field type of the input field based on the metadata, and adjust a handwriting recognition engine based on the field type, thereby improving the accuracy of handwriting recognition. Adjusting the handwriting recognition engine may include increasing a weight given to text having particular characteristics, based on the field type. Obtaining the metadata related to an input field may include querying an application for properties of the input field and/or identifying text adjacent to the input field.

FIG. 1 depicts a system 100 for context-aware handwriting recognition for input fields, according to embodiments of the disclosure. The system 100 includes an electronic device 101. The electronic device 101 comprises a processor 102, an input device 104, a context-aware recognition module 106, a handwriting recognition engine 110, and a memory 112. In some embodiments, the electronic device 101 also includes display 108. The components of the electronic device 101 may be communicatively coupled to each other, for example via a computer bus.

The processor 102, in one embodiment, may comprise any known controller capable of executing computer-readable instructions and/or capable of performing logical operations. For example, the processor 102 may be a microcontroller, a microprocessor, a central processing unit (CPU), a graphics processing unit (GPU), an auxiliary processing unit, a FPGA, or similar programmable controller. In some embodiments, the processor 102 executes instructions stored in the memory 112 to perform the methods and routines described herein. The processor 102 is communicatively coupled to the input device 104, the context-aware recognition module 106, the display 108, and the memory 112.

The input device 104, in one embodiment, may comprise any known computer input device including a touch panel, a button, a keyboard, or the like. For example, the input device 104 may be a handwriting input unit operatively coupled to the processor 102. In some embodiments, the input device 104 may be integrated with the display 108, for example, as a touchscreen or similar touch-sensitive display. In some embodiments, the input device 104 comprises a touchscreen and text may be input by using a virtual keyboard displayed on the touchscreen and/or by handwriting on the touchscreen. In some embodiments, the input device 104 comprises two or more different devices, such as a keyboard and a touch panel.

The context-aware recognition module 106, in one embodiment, receives handwriting input from the input device 104, obtains metadata relating to an input field associated with the handwriting input, identifies a field type of the input field based on the metadata, and adjusts a handwriting recognition engine based on the field type, thereby improving handwriting recognition. In some embodiments, the context-aware recognition module 106 adjusts the handwriting recognition engine by increasing a weight given by the handwriting recognition engine to text having certain properties or characteristics associated with the field type.

In certain embodiments, the context-aware recognition module 106 obtains metadata related to the input field and identifies the field type of the input field based on the metadata, for example by querying an application for properties of the input field and/or by identifying text adjacent to the input field. In certain embodiments, the context-aware recognition module 106 associates the handwriting input with an input field, for example based on a field type of the input field or on a location of the handwriting input.

The context-aware recognition module 106 may be comprised of computer hardware, computer software, or a combination of both computer hardware and computer software. For example, the context-aware recognition module 106 may comprises circuitry, or a processor, configured to receive handwriting input and/or obtain metadata. As another example, the context-aware recognition module 106 may comprise computer program code that allows the processor 102 to adjust a handwriting recognition engine based on a field type. The context-aware recognition module 106 is discussed in further detail with reference to FIG. 2, below.

The display 108, in one embodiment, may comprise any known electronic display capable of outputting visual data to a user. For example, the display 108 may be an LCD display, an LED display, an OLED display, a projector, or similar display device capable of outputting images, text, or the like to a user. In some embodiments, the display 108 may be integrated with the input device 104, for example, as a touchscreen or similar touch-sensitive display. The display 108 may receive data for display from the processor 102 and/or the context-aware recognition module 106.

The handwriting recognition engine 110, in one embodiment, is configured to interpret handwritten input and convert it into digital text usable by a text-processing application or other application running on the electronic device 101. For example, the handwriting recognition engine 110 may identify words, characters, and/or strokes within the handwriting input and convert (i.e., translate) them into words, letters, and/or characters that are usable within text-processing applications.

In some embodiments, the handwriting recognition engine 110 employs a language model to interpret handwriting input. A language model describes language properties and may include probabilistic models for interpreting text images according to language rules and/or usage statistics. In general, language models used with handwriting recognition software are compiled using large samples of prose. The handwriting recognition engine 110 may use the language model to determine a probability for each character or word in the handwriting input and may output those characters or words having the highest probabilities of matching the handwriting input.

The handwriting recognition engine 110 may be comprised of computer hardware, computer software, or a combination of both computer hardware and computer software. For example, the handwriting recognition engine 110 may comprises circuitry, or a processor, configured to receive handwriting input and/or obtain metadata. As another example, the handwriting recognition engine 110 may comprise computer program code that allows the processor 102 to adjust a handwriting recognition engine based on a field type.

The memory 112, in one embodiment, is a computer readable storage medium. In some embodiments, the memory 112 includes volatile computer storage media. For example, the memory 112 may include a random access memory (RAM), including dynamic RAM (DRAM), synchronous dynamic RAM (SDRAM), and/or static RAM (SRAM). In some embodiments, the memory 112 includes non-volatile computer storage media. For example, the memory 112 may include a hard disk drive, a flash memory, or any other suitable non-volatile computer storage device. In some embodiments, the memory 112 includes both volatile and non-volatile computer storage media.

In some embodiments, the memory 112 stores data relating to context-aware handwriting recognition. For example, the memory 112 may store handwriting input, acquired metadata, and/or display data. The memory 112 may further store program code and data. In some embodiments, the memory 112 stores user data, such as contacts, browsing history, and the like. In certain embodiments, the memory 112 also stores program code and/or data for one or more applications actively running on the electronic device 101, including display data and metadata related to an input field. In some embodiments, the memory 112 also stores an operating system operating on the electronic device 101.

Figure 2:
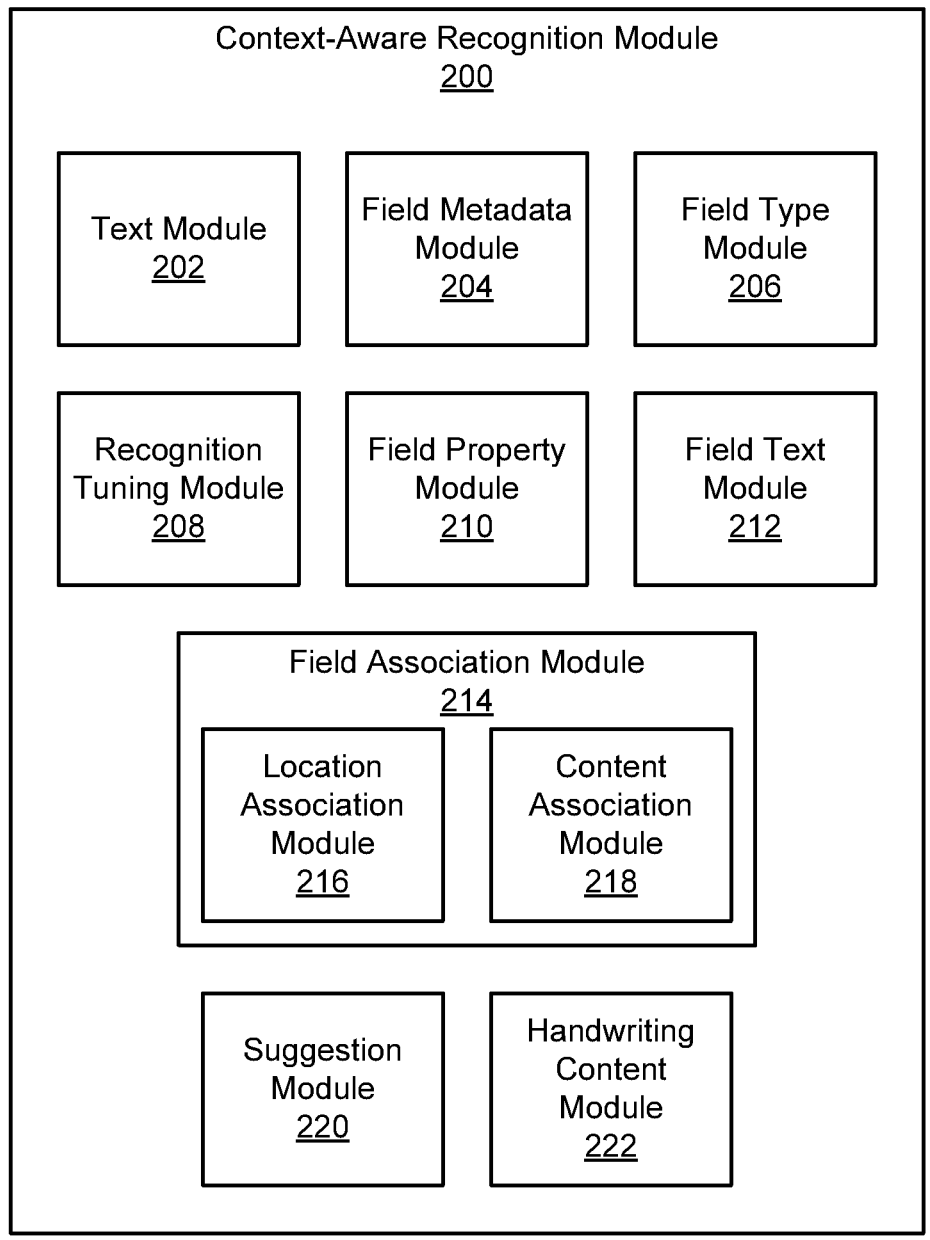
FIG. 2 is a schematic block diagram illustrating one embodiment of an apparatus for context-aware handwriting recognition.

FIG. 2 depicts a context-aware recognition module 200 for handwriting recognition of input fields, according to embodiments of the disclosure. In some embodiments, the apparatus 200 may be similar to, and perform the same functions as, the context-aware recognition module 106 described above with reference to FIG. 1. In general, as described above, the context-aware recognition module 200 receives handwriting input, identifies a field type of an input field associated with the handwriting input, and adjusts a handwriting recognition engine based on the identified field type. The context-aware recognition module 200 includes a text module 202, a field metadata module 204, a field type module 206, and a recognition tuning module 208. In some embodiments, the context-aware recognition module 200 also includes one or more of a field property module 210, a field text module 212, a field association module 214, a location association module 216, and/or a content association module 218. The modules of the context-aware recognition module 200 may be communicatively coupled to one another.

The text module 202, in one embodiment, is configured to receive handwriting input from a handwriting input device, such as the input device 104. In some embodiments, the text module 202 parses the handwriting input to identify separate words, characters, or strokes. The text module 202 may forward the parsed portions of the handwriting input to a handwriting recognition engine which then identifies the words, characters, and/or strokes and converts (e.g., translates) them into words, letters, and/or characters that are usable within a computer and/or text-processing applications. In some embodiments, the text module 202 creates a digital image of the handwriting input for processing by the handwriting recognition engine.

In some embodiments, the text module 202 identifies a location associated with the handwriting input. The location is identified with respect to an on-screen location, such as a window or a GUI presented to the user. For example, if a digitizing tablet is used to input the handwritten text, the location may be identified in relation to one or more on-screen positions corresponding to locations of the digitizing tablet where the input received. In some embodiments, the location corresponds to a cursor position at a time when the handwriting input is received. For example, where a digitizing pen is used, the on-screen location may correspond to a position of a cursor immediately prior to receiving the handwriting input. In some embodiments, the on-screen location may be a beginning position, an ending position, or the like. In other embodiments, the on-screen location may be an area encompassed by the handwriting input.

In some embodiments, the text module 202 receives output from the handwriting recognition engine (i.e., digital text usable by a text-processing application) and associates the recognition engine output text with the handwriting input. The text module 202 may replace the handwriting input with the received output text.

The field metadata module 204, in one embodiment, is configured to obtain, or gather, metadata relating to an input field associated with a handwriting input. The metadata may describe a property or characteristic of the input field. For example, the metadata relating to an input field may include a field descriptor, a field type, a tag corresponding to the input field, or the like. Gathering metadata improves handwriting recognition as the metadata indicates an expected form of the handwriting input (e.g., a name, a phone number, or the like). In some embodiments, the field metadata module 204 obtains the metadata via another module operatively coupled to the field metadata module 204, such as the field property module 210 or the field text module 212. In other embodiments, the field metadata module 204 is configured to directly obtain the metadata.

In some embodiments, the field metadata module 204 obtains metadata by querying an application for information pertaining to the input field, such as field properties, field descriptors, or the like. In some embodiments, the field metadata module 204 obtains metadata by scanning and analyzing text adjacent to the input field. In certain embodiments, the field metadata module 204 obtains metadata by both querying an application and by scanning the text adjacent to the input field. For example, the field metadata module 204 may query an application to which the input field belongs for information concerning the input field. If the application fails to provide sufficient information, the field metadata module 204 may then analyze the text adjacent to the input field in order to obtain sufficient metadata for the field type module 206 to identify a field type for the input field.

The field metadata module 204 is configured to obtain metadata for input fields near a location of the handwriting input. For example, metadata may be obtained for input fields near a location on a GUI corresponding to a position of a digital pen. As another example, metadata may be gathered for input fields adjacent to a cursor location as handwriting input is received. In certain embodiments, the field metadata module 204 obtains metadata for each input field within a predefined distance of the location of the handwriting input. In other embodiments, the field metadata module 204 obtains metadata for a predefined number of nearest input fields. These nearby input fields are associated with the input field. In some embodiments, the field metadata module 204 receives an indication of nearby input fields (i.e., associated input fields) and obtains metadata for these indicated input fields. In other embodiments, the field metadata module 204 is configured to determine which input fields are associated with (i.e., nearby) the handwriting input.

The field type module 206, in one embodiment, is configured to identify a field type of the input field based on the metadata. The field metadata module 204 analyzes the metadata obtained by the field metadata module 204 to determine one or more field types of the input field. The field type may include one or more of: an email address field, a password field, an autocomplete field, a street address field, a web address or URI field, a phone number field, and a name field. In some embodiments, the field type module 206 compares metadata received from the field metadata module 204 to a list or database of field types. The list or database may be searchable by key word, the keyword being parsed from the metadata. In response to the metadata matching an entry of the list or database, the field type module 206 may identify a field type corresponding to the matching entry.

The recognition tuning module 208, in one embodiment, is configured to adjust a handwriting recognition engine, such as the handwriting recognition engine 110, based on the field type. In some embodiments, the field type module 206 causes the handwriting recognition engine to preferentially select text—for example words, characters, or the like—having characteristics and/or formats associated with the field type over text having characteristics and/or that are not associated with the field type. In certain embodiments, the recognition tuning module 208 adjusts the handwriting recognition engine by increasing a weight given by the handwriting recognition engine to text having particular properties or characteristics associated with the field type. In certain embodiments, the recognition tuning module 208 adjusts the handwriting recognition engine by selecting a database or list for the handwriting recognition engine to first use when analyzing the handwriting input to find matching text.

In some embodiments, the recognition tuning module 208 may modify a language model used by the handwriting recognition engine 110, based on a field type of an associated input field. In certain embodiments, recognition tuning module 208 may cause the handwriting recognition engine 110 to use a language model specific to the field type. In other embodiments, the recognition tuning module 208 may cause the handwriting recognition engine 110 to attach a higher likelihood to certain results and/or formats based on the field type. For example, the recognition tuning module 208 may adjust the handwriting recognition engine 110 to preferentially select for known countries, cities, states, providences, etc., within the received handwriting input, in response to the field type module 206 identifying the field type as a street address. The recognition tuning module 208 may also adjust the handwriting recognition engine 110 to select for standard address formats in response to the field type being a street address.

As another example, the recognition tuning module 208 may modify the handwriting recognition engine 110 to favor digits and standard formats in response to the field type being a phone number. Further, the recognition tuning module 208 may adjust the handwriting recognition engine 110 to favor recognition of individual characters and/or to avoid selecting common words and/or phrases within the received handwriting input, in response to the field type module 206 identifying the field type as a password field and/or a username field.

In some embodiments, the recognition tuning module 208 causes the handwriting recognition engine 110 to search a user's contact for text matching the handwriting input in response to the identified field type being a phone number, a street address, and/or an email address. In some embodiments, the recognition tuning module 208 causes the handwriting recognition engine 110 to search a user's web browsing history for text matching the handwriting input in response to the identified field type being a web address, URI, or URL. Additionally, for an autocomplete field that includes a list of suggested entries, the recognition tuning module 208 may modify the handwriting recognition engine 110 to favor members of the list of suggested entries.

In some embodiments, the recognition tuning module 208 will refrain from adjusting the handwriting recognition engine 110 in response to the field type module 206 being unable to identify a field type for the input field, for example due to insufficient or conflicting metadata associated with the input field. In other embodiments, in response to the field type module 206 identifying multiple field types for the input field, the recognition tuning module 208 may give an equal, increased weight to recognition results with characteristics matching one of the identified field types, while giving a decreased weight to recognition results without characteristics matching the identified field types.

The field property module 210, in one embodiment, is configured to query an application for properties of the input field and provides results of the query as metadata to the field metadata module. In some embodiments, the field property module 210 identifies and queries an application to which the input field belongs to obtain metadata relating to the input field. In other embodiments, the field property module 210 queries an operating system, an API, or the like to obtain the metadata. In certain embodiments, the field property module 210 is a component of the field metadata module 204, while in other embodiments the field property module 210 is an independent module that provides information to the field metadata module 204. In further embodiments, the field property module 210 is configured to parse code related to the input field, for example HTML code for a webpage to which the input field belongs, to identify tags or other metadata related to the input field.

The field text module 212, in one embodiment, is configured to identify text adjacent to the input field and provides the text as metadata to the field metadata module 206. For example, an input field may have a text box below it containing the word "address." The field text module 212 may identify that there is text adjacent to the input field and may analyze the adjacent text to determine that it contains the word "address." The field text module 212 may then provide the identified text "address" to the field metadata module 204. The field text module 212 may determine that particular text is adjacent to the input field by comparing a distance between the particular text and the input field. In response to the distance being within a predetermined range (i.e., by comparing to a predetermined threshold), the field text module 212 may determine that the particular text qualifies as adjacent text.

In some embodiments, the field text module 212 accesses display data to locate and analyze text adjacent to the input field. In some embodiments, the field text module 212 queries the application to which the input field belongs to identify text adjacent to the input field. In other embodiments, the field text module 212 parses code of the application to which the input field belongs to locate and analyze text adjacent to the input field. In certain embodiments, the field text module 212 is a component of the field metadata module 204, while in other embodiments the field text module 212 is an independent module that provides information to the field metadata module 204.

The field association module 214, in one embodiment, is configured to associate handwriting input with a particular input field. The field association module 214 may include a location association module 216 and a content association module 218, The field association module 214 may associate the handwriting input with an input field based on location of the handwriting input, the content of the handwriting input, or on both location and content of the handwriting input.

In some embodiments, the field association module 214 associates the handwriting input with an input field by identifying a plurality of input fields that are located within a predetermined distance of each other, analyzing content of the handwriting input, and selecting one of the plurality of input fields based on the content of the handwriting input. In some embodiments, the field association module 214 makes a preliminary association based on location and makes a final association based on the content of the handwriting input.

The location association module 216, in one embodiment, is configured to associate the handwriting input with a particular input field based on a location of the handwriting input. The location association module 216 obtains the location of the handwriting input with respect to an on-screen location. The on-screen location may be a beginning position of the handwriting input, an ending position of the handwriting input, an area encompassed by the handwriting input, or the like. In some embodiments, the location association module 216 receives a location associated with the handwriting input from the text module 202. In other embodiments, the location association module 216 identifies a location associated with the handwriting input.

The location association module 216 is further configured to obtain a position of an input field. Where multiple input fields are present, the location association module 216 obtains the positions of each input field. In certain embodiments, the location association module 216 calculates a distance between the handwriting input and each input field. For example, the location association module 216 may calculate the distance between the center of the handwriting input and the center of an input field.

In some embodiments, the location association module 216 associates the handwriting input with a nearest input field (i.e., the input field having the smallest distance to the handwriting input). In other embodiments, the location association module 216 associates the handwriting input with each input field within a predetermined threshold. For example, the location association module 216 may compare each distance to a maximum distance (i.e., predefined threshold).

In some embodiments, the location association module 216 associates the handwriting input with a particular input field on a preliminary basis based on the locations of the handwriting input and the input field. At a later point in time, the field association module 214 and/or the content association module 218 may verify the preliminary association based on recognizes content of the handwriting input and an identified field type of the input field.

The content association module 218, in one embodiment, is configured to associates the handwriting input with a particular input field based on a field type of the particular input field and content of the handwriting input. The input field nearest to the handwriting input may not be the one the user intends to write to. For example, parallax in a touch-screen may cause the location of the handwriting input to lie between two input fields. The handwriting input may be used to infer to which input field the user intends to write.

In some embodiments, the content association module 218 calculates a probability or likelihood that the recognized handwriting input matches an input field type. The field association module 214, the location association module 216, and/or the content association module 218 may identify a plurality of input fields near a location of the handwriting input and the content association module 218 may then determine, for each nearby input field, a likelihood that the handwriting input matches the input field type. The content association module 218 may then associate the handwriting input with an input field having the greatest likelihood.

In some embodiments, the content association module 218 searches the recognized handwriting input for characteristics or formats unique to the input field type. For example, where two input fields are near the handwriting input, one input field being and email address field and the other being a phone number field, the field association module 214 may determine whether the recognized handwriting input consists solely of numerals. The field association module 214 may then associate the handwriting input with the phone number field in response to the content being solely numerals and may otherwise associate the handwriting input with the email address field.

In certain embodiments, the content association module 218 compares the content and/or the format of the handwriting input to the input field type. In some embodiments, the content association module 218 receives the input type and words, formats, characteristics, or symbols of the input type from the field type module 206. The content association module 218 may perform an analysis similar to the field type module 206, except using recognized content in place of metadata to determine a field type.

For example, words, formats, characteristics, or symbols may be identified within the recognized handwriting input and compared to words, formats, characteristics, or symbols that are characteristic of the input field type. In response to matching words, formats, characteristics, or symbols, the handwriting input may be associated with the input field. In contrast, if there are no matching words, formats, characteristics, or symbols, then the handwriting input may be associated with another candidate input field. In response to the content association module 218 being unable to identify a most likely candidate input field, the handwriting input may be associated with an input field based solely on location.

In some embodiments, the content association module 218 performs a final association by comparing the field type of a preliminary associated input field to content of the handwriting input to determine whether the handwriting input is associated with the particular input field. An input field may be associated on a preliminary basis using the locations of the handwriting input and the input field and the content association module 218 may confirm the association by comparing content of the handwriting input to the field type of the input field.

The suggestion module 220, in one embodiment, is configured to provide an input suggestion based on an identified input field type. In some embodiments, the suggestion module 220 provides suggestions from a contacts database in response to the field type being an email address field, an address field, a telephone number field, and/or a uniform resource locator field. The suggestion may be used to correct an incorrectly entered and/or incorrectly recognized input. For example, where the input field type corresponds to an email address field, the handwriting recognition engine interprets the handwriting input as "jancdoe@email.com," and the contacts database include an entry "janedoe@email.com," the suggestion module 220 may suggest the contacts database entry to the user. Alternatively, the suggestion may be used to improve input speed.

In some embodiments, the suggestion module 220 provides an input suggestion in response to the field type module 206 identifying a field type of the associated input field. In some embodiments, the suggestion module 220 provides an input suggestion in response to the content of the recognized handwriting input not matching the field type. For example, where the input field type corresponds to an email address field and the handwriting input is as "John Smith," the suggestion module 220 may suggest an email address belonging to "John Smith" from the contacts database.

The handwriting content module 222, in one embodiment, is configured to determine content of the handwriting input based on output from the handwriting recognition engine, such as the handwriting recognition engine 110. In some embodiments, the handwriting content module 222 identifies words, formats, characteristics, symbols, and the like in the recognition engine output that are indicative of the content of the handwriting input. For example, if the handwriting recognition engine 110 output contains a sequence of ten digits, the handwriting content module 222 may identify the sequence of digits as an indicator that the handwriting input includes a phone number. As another example, if the handwriting recognition engine 110 output contains the symbol "@" (i.e., an indicator of an email address) the handwriting content module 222 may determine that the handwriting input includes an email address.

The handwriting content module 222 may provide the content of the handwriting input to the field association module 214 and/or the content association module 218, for associating the handwriting input with an input field based on content of the handwriting input. In some embodiments, the handwriting content module 222 is a component of the text module 202, field association module 214, and/or the content association module 218 while in other embodiments the handwriting content module 222 is an independent module that provides information to the text module 202, field association module 214, and or content association module 218.

FIG. 3A-3D depict a contextual recognition apparatus 300 for context-aware handwriting recognition of input fields, according to embodiments of the disclosure. The contextual recognition apparatus 300 receives handwriting input, identifies a field type of an input field associated with the handwriting input, and adjusts a handwriting recognition engine based on the identified field type. The contextual recognition apparatus 300 may be similar to the context-aware recognition module 106 and/or the context-aware recognition module 200 described above with reference to FIGS. 1 and 2.

The contextual recognition apparatus 300 includes a touchscreen input device 302 displaying a graphical user interface (GUI). As depicted in FIG. 3A-3D, the GUI is a welcome screen that includes an email address input field 304 and a password input field 306. The email address input field 304 and the password input field 306 are in relatively close proximity to one another. In some embodiments, the contextual recognition apparatus 300 may also include one or more of a text module, a field metadata module, a field type module, a handwriting recognition engine, and a recognition tuning module, as described above with reference to FIGS. 1 and 2.

Figure 3B:
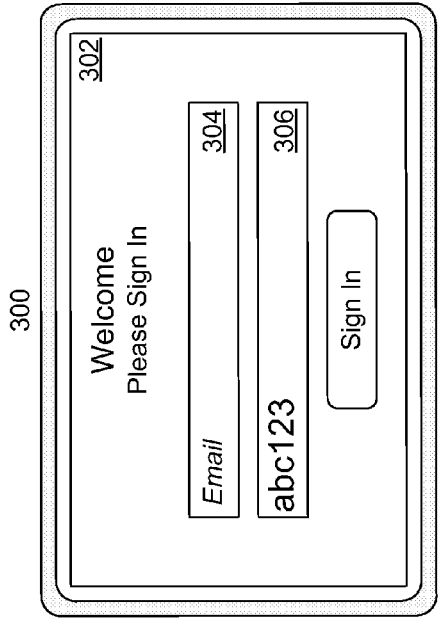
FIG. 3B is a diagram illustrating another embodiment of an apparatus for context-aware handwriting recognition.
Figure 3D:
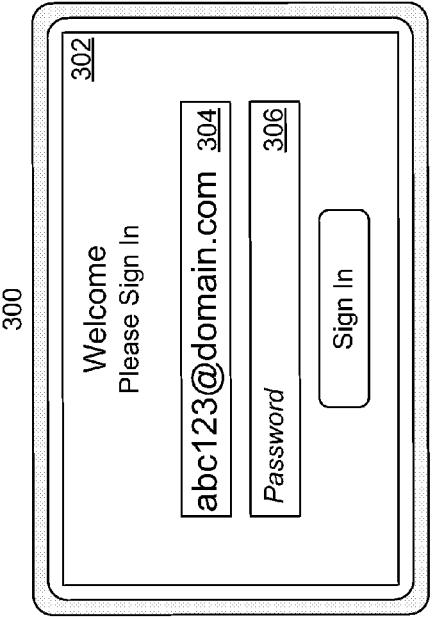
FIG. 3D is a diagram illustrating another embodiment of an apparatus for context-aware handwriting recognition.
Figure 3A:
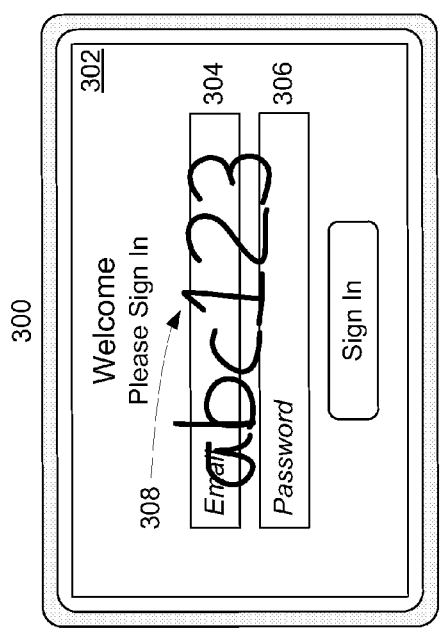
FIG. 3A is a diagram illustrating one embodiment of an apparatus for context-aware handwriting recognition.

FIG. 3A depicts the contextual recognition apparatus 300 in a state after receiving the handwriting input "abc123." The handwriting input may be received via stylus, finger, or other touch input device. As depicted, the first character (i.e., "a") of a majority of the handwriting input is located within the email address input field 304, however the handwriting input is also near the password input field 306 and a portion of the handwriting input is within the password input field 306. Accordingly, the contextual recognition apparatus 300 associates the handwriting input with both the email address input field 304 and the password input field 306.

The contextual recognition apparatus 300 then identified the field types of the input fields 304, 306 (i.e., an email address field and a password field, respectively) and adjusts the handwriting recognition engine to favor characteristics of the associated input fields. For example, the handwriting recognition engine may favor individual character recognition (due to the password field) and standard email formats (due to the email address field).

FIG. 3B depicts the contextual recognition apparatus 300 in a state after the handwriting recognition engine converts the handwriting input into computer-usable text. As depicted, the contextual recognition apparatus 300 performs a conclusive association of the handwriting input based on the content of the handwriting input. The contextual recognition apparatus 300 analyzes the content of the handwriting input and determines that it more closely resembles a password instead of an email address. Thus, the contextual recognition apparatus 300 associates the handwriting input solely with the password input field 306 and inserts the converted handwriting input (i.e., the computer-usable text) into the password input field 306. Although FIG. 3B depicts the password input field 306 containing plain-text (i.e., "abc123"), in other embodiments, the password input field 306 may contain obscured text, such as mask characters in place of plain-text characters (e.g., "******").

Figure 3C:
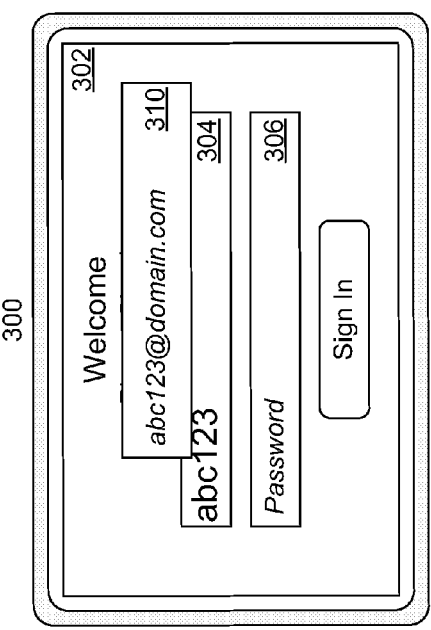
FIG. 3C is a diagram illustrating another embodiment of an apparatus for context-aware handwriting recognition.

FIG. 3C depicts an alternative state of the contextual recognition apparatus 300 after the handwriting recognition engine converts the handwriting input into computer-usable text. Here, the contextual recognition apparatus 300 determines that the text "abc123" matches a username portion of an address stored in the user contacts database, and thus conclusively associates the handwriting input solely with the email address input field 304, based on both the location of the handwriting input and the content of the handwriting input, and inserts the converted handwriting input (i.e., the computer-usable text) into the email address input field 304. Further, the contextual recognition apparatus 300 recognizes that the text "abc123" does not match standard email address formats and provides a suggestion 310 of the email address "abc123@domain.com" found in the user's contacts database. FIG. 3D depicts the contextual recognition apparatus 300 in the alternative state after the user accepts the suggested email address. The contextual recognition apparatus 300 then inserts the accepted suggestion 310 into the email address input field 304.

Figure 4:
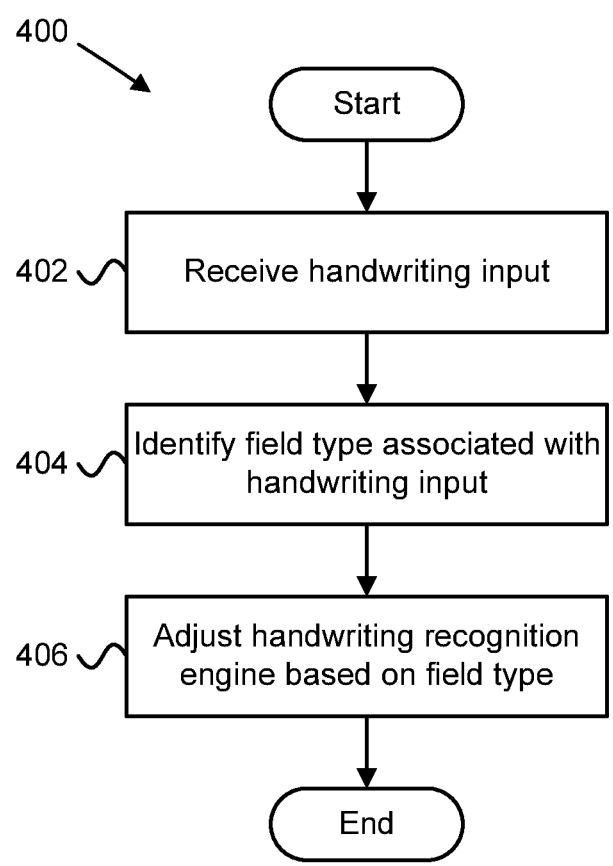
FIG. 4 is a schematic flow chart diagram illustrating one embodiment of a method for context-aware handwriting recognition.

FIG. 4 depicts a method 400 for context-aware handwriting recognition of input fields, according to embodiments of the disclosure. In some embodiments, the method 400 is performed using a context-aware recognition device, such as the context-aware recognition module 106, the context-aware recognition module 200, and/or the contextual recognition apparatus 300 described above with reference to FIGS. 1-2 and 3A-3D. In some embodiments, the method 400 is performed by a processor, such as a microcontroller, a microprocessor, a central processing unit (CPU), a graphics processing unit (GPU), an auxiliary processing unit, a FPGA, or the like.

The method 400 begins with the context-aware recognition device receiving 402 handwriting input. For example, a user may input the handwriting input via a digital pen, via a stylus and touch-sensitive panel (e.g., a touchscreen), or via another suitable handwriting input device. In some embodiments, the input text is received 402 using a text module (e.g., the text module 202). In certain embodiments, the input text is received 402 directly from an input device (e.g., the input device 104). In certain embodiments, the input text is received 402 from a processor (e.g., the processor 102) or another controller. In further embodiments, the input text may be received 402 from a networked device via the processor or controller.

In some embodiments, receiving 402 the handwriting input text includes determining a location of the handwriting input with respect to one or more input fields on a GUI. The determined location of the handwriting input may be a starting location of a first handwriting stroke, an ending location of a last handwriting stroke, an area encompassed by the handwriting input, a cursor location during receipt of the handwriting input, or the like. The determined location may include one or more pixel coordinates corresponding to the handwriting input. In some embodiments, receiving 402 the handwriting input text includes associating one or more input fields with the handwriting input based on the locations of the handwriting input and the input fields.

The context-aware recognition device then identifies 404 a field type of an input field associated with the handwriting input. In some embodiments, a plurality of input fields are associated with the handwriting input and identifying 404 the field type includes identifying a field type for each of the plurality of associated input fields. The input field type may indicate a category or format of input expected by the input field. For example, an input field with a field type of "email address" would expect to receive an email address conforming to standard email address formats (i.e., username @ domain). As another example, an input field with a field type of "phone number" would expect to receive a plurality of digits conforming to standard phone number formats.

In some embodiments, identifying 404 the field type includes obtaining metadata relating to the input field, the metadata being used to identify the handwriting input. The metadata may be used to search a table or database which correlates metadata (or key terms) to field types.

The context-aware recognition device then adjusts 406 a handwriting recognition engine based on the identified field type. Where two or more field types are identified, such as where a plurality of input fields are associated with the handwriting input, the adjustment 406 may be based on all identified field types. In certain embodiments, adjusting 406 the handwriting recognition engine includes modifying a language model used by the handwriting recognition engine to select for text conforming to the categories and/or formats foreseen by the input field type. For example, if the field type is a phone number, the handwriting recognition engine may be adjusted 406 to favor digits and disfavor letters. Additionally, the handwriting recognition engine may be adjusted 406 to arrange recognized characters in standard phone number formats.

In certain embodiments, adjusting 406 the handwriting recognition engine includes modifying the handwriting recognition engine to preferentially select text from a list, table, or database related to the input field type. For example, if the field type is an email address, the handwriting recognition engine may be adjusted 406 to prefer email addresses found in a user's contacts database. In certain embodiments, adjusting 406 the handwriting recognition engine includes adapting the handwriting recognition engine to avoid certain words, character combinations, or symbols when interpreting the handwriting input. For example, if the field type is a password field, adjusting 406 the handwriting recognition engine may include ignoring common words and to independently evaluate each handwriting character. The method 400 ends.

Figure 5:
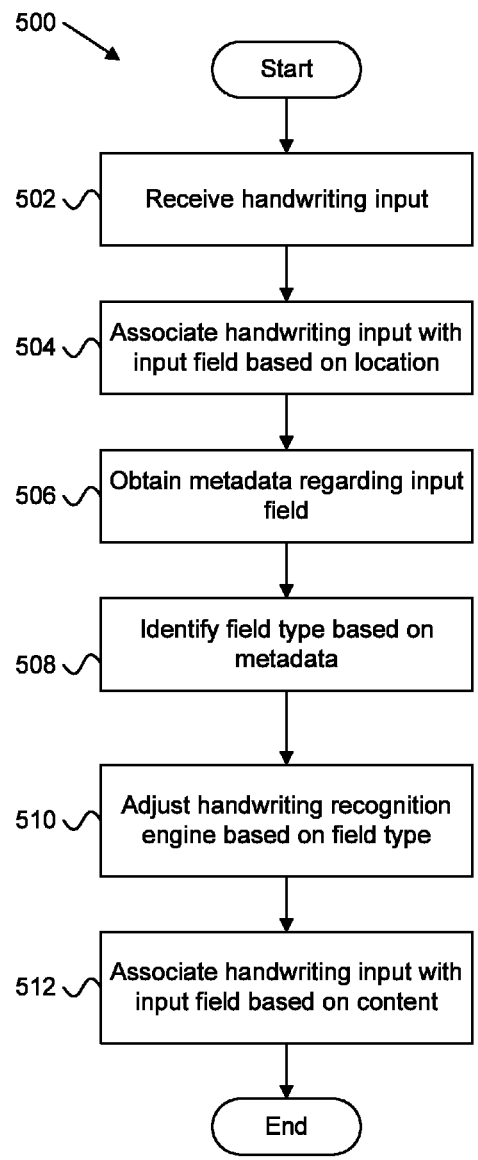
FIG. 5 is a schematic flow chart diagram illustrating another embodiment of a method for context-aware handwriting recognition.

FIG. 5 depicts a method 500 for context-aware handwriting recognition of input fields, according to embodiments of the disclosure. In some embodiments, the method 500 is performed using a context-aware recognition device, such as the context-aware recognition module 106, the context-aware recognition module 200, and/or the contextual recognition apparatus 300 described above with reference to FIGS. 1-2 and 3A-3D. In some embodiments, the method 500 is performed by a processor, such as a microcontroller, a microprocessor, a central processing unit (CPU), a graphics processing unit (GPU), an auxiliary processing unit, a FPGA, or the like.

The method 500 begins with the context-aware recognition device receiving 502 handwriting input. For example, a user may input the handwriting input via a digital pen, via a stylus and touch-sensitive panel (e.g., a touchscreen), or via another suitable handwriting input device. In some embodiments, the input text is received 502 using a text module (e.g., the text module 202). In certain embodiments, the input text is received 502 directly from an input device (e.g., the input device 104). In certain embodiments, the input text is received 502 from a processor (e.g., the processor 102) or another controller. In further embodiments, the input text may be received 602 from a networked device via the processor or controller.

In some embodiments, receiving 502 the handwriting input text includes determining a location of the handwriting input with respect to one or more input fields on a GUI. The determined location of the handwriting input may be a starting location of a first handwriting stroke, an ending location of a last handwriting stroke, an area encompassed by the handwriting input, a cursor location during receipt of the handwriting input, or the like. The determined location may include one or more pixel coordinates corresponding to the handwriting input.

The context-aware recognition device then associates 504 one or more input fields with the handwriting input based on the locations of the handwriting input and the input fields. In certain embodiments, a predetermined number of nearest input fields are associated 504 with the handwriting input. In other embodiments, each input field within a predetermined distance of the handwriting input is associated 504 with the handwriting input. For example, all input fields within 100 pixels of the handwriting input may be associated with the handwriting input.

In further embodiments, multiple input fields are associated 504 with the handwriting input only when a distance between an additional input field and the handwriting input is within a predetermined percentage of the distance between the nearest input field and the handwriting input. For example, if the predetermined percentage is 150% and a nearest input field is 50 pixels away from the handwriting input, any input fields with 75 pixels of the handwriting input would also be associated 504 with the handwriting input.

The context-aware recognition device obtains 506 metadata regarding the associated input field. If more than one input field is associated with the handwriting input, then the context-aware recognition device obtains metadata for each associated input field. Metadata regarding the input field may include a field descriptor, a field type, a tag corresponding to the input field, or the like. In some embodiments, obtaining 506 metadata includes querying an application associated with the input field. For example, if the handwriting input is associated with an input field of a web page, a web browser presenting the web page may be queried to obtain 506 the metadata.

In some embodiments, obtaining 506 metadata includes scanning and analyzing text adjacent to the input field. For example, an input field may have a text box below it containing the word "address." The context-aware recognition device may identify that there is text adjacent to the input field, analyze the adjacent text to determine that it contains the word "address." Obtaining 506 metadata may include accessing display data to locate and analyze text adjacent to the input field or may include parsing code of the application to locate and analyze text adjacent to the input field.

The context-aware recognition device then identifies 508 a field type of each associated input field based on the metadata. In some embodiments, a plurality of input fields are associated with the handwriting input and identifying 508 the field type includes identifying a field type for each of the plurality of associated input fields. The metadata may be used to search a table or database which correlates metadata (or key terms) to field types. The input field type may indicate a category or format of input expected by the input field. For example, an input field with a field type of "email address" would expect to receive an email address conforming to standard email address formats (i.e., username @ domain). As another example, an input field with a field type of "phone number" would expect to receive a plurality of digits conforming to standard phone number formats.

The context-aware recognition device then adjusts 510 a handwriting recognition engine based on the identified field type. Where two or more field types are identified, such as where a plurality of input fields are associated with the handwriting input, the adjustment 510 may be based on all identified field types. In certain embodiments, adjusting 510 the handwriting recognition engine includes modifying a language model used by the handwriting recognition engine to select for text conforming to the categories and/or formats foreseen by the input field type. For example, if the field type is a phone number, the handwriting recognition engine may be adjusted 510 to favor digits and disfavor letters. Additionally, the handwriting recognition engine may be adjusted 510 to arrange recognized characters in standard phone number formats.

In certain embodiments, adjusting 510 the handwriting recognition engine includes modifying the handwriting recognition engine to preferentially select text from a list, table, or database related to the input field type. For example, if the field type is an email address, the handwriting recognition engine may be adjusted 510 to prefer email addresses found in a user's contacts database. In certain embodiments, adjusting 510 the handwriting recognition engine includes adapting the handwriting recognition engine to avoid certain words, character combinations, or symbols when interpreting the handwriting input. For example, if the field type is a password field, adjusting 510 the handwriting recognition engine may include ignoring common words and to independently evaluate each handwriting character.

The context-aware recognition device then associates 512 the handwriting input with an input field based on the content of the handwriting input, as determined by the handwriting recognition engine. The method 500 ends. Imprecise placement of a finger, stylus, or digital pen may result in the handwriting input being closer to an input field other than the intended input field. In some embodiments, associating 512 the handwriting input with an input field includes calculating, for each nearby input field, a probability or likelihood that the recognized handwriting input matches an input field type. The handwriting input may then be associated 512 with an input field having the greatest likelihood.

In some embodiments, associating 512 the handwriting input with an input field includes searching the recognized handwriting input for characteristics or formats unique to the input field type. For example, words, formats, characteristics, or symbols within the recognized handwriting input may be compared to the input field type to determine a match. In response to matching words, formats, characteristics, or symbols, the handwriting input may be associated 512 with the input field. In certain embodiments, associating 512 the handwriting input with an input field, in one embodiment, also includes determine content of the handwriting input based on output from the handwriting recognition engine. The method 500 ends.

Figure 6:
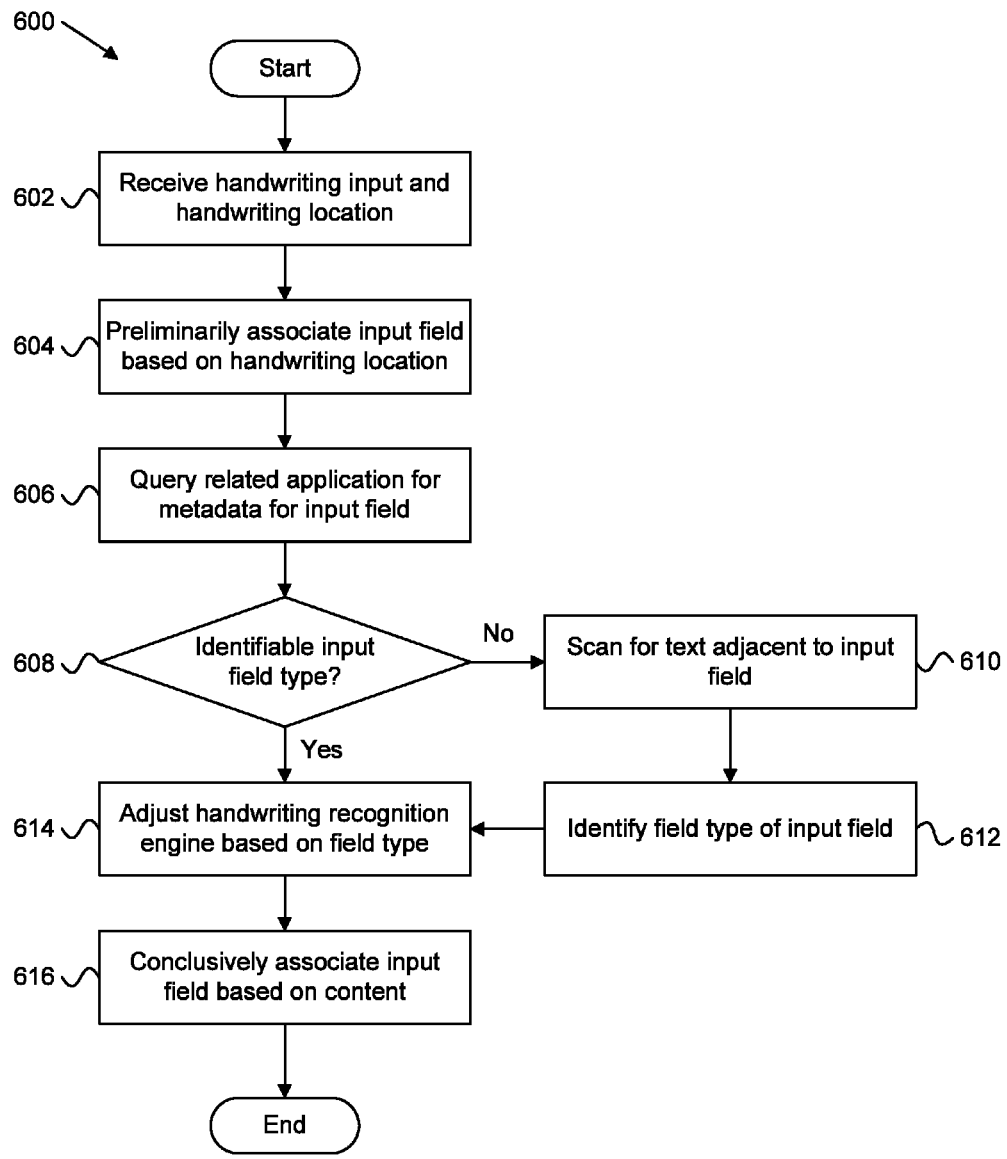
FIG. 6 is a schematic flow chart diagram illustrating another embodiment of a method for context-aware handwriting recognition.

FIG. 6 depicts a method 600 for context-aware handwriting recognition of input fields, according to embodiments of the disclosure. In some embodiments, the method 600 is performed using a context-aware recognition device, such as the context-aware recognition module 106, the context-aware recognition module 200, and/or the contextual recognition apparatus 300 described above with reference to FIGS. 1-2 and 3A-3D. In some embodiments, the method 600 is performed by a processor, such as a microcontroller, a microprocessor, a central processing unit (CPU), a graphics processing unit (GPU), an auxiliary processing unit, a FPGA, or the like.

The method 600 begins with the context-aware recognition device receiving 602 handwriting input and a handwriting location. For example, a user may input the handwriting input via a digital pen, via a stylus and touch-sensitive panel (e.g., a touchscreen), or via another suitable handwriting input device. In some embodiments, the input text is received 602 using a text module (e.g., the text module 202). In certain embodiments, the input text is received 602 directly from an input device (e.g., the input device 104). In certain embodiments, the input text is received 602 from a processor (e.g., the processor 102) or another controller. In further embodiments, the input text may be received 602 from a networked device via the processor or controller.

In some embodiments, receiving 602 the handwriting location includes determining a position of the handwriting input with respect to one or more input fields on a GUI. The determined position of the handwriting input may be a starting location of a first handwriting stroke, an ending location of a last handwriting stroke, an area encompassed by the handwriting input, a cursor position during receipt of the handwriting input, or the like. The determined position may include one or more pixel coordinates corresponding to the handwriting input.

The context-aware recognition device then associates 604 one or more input fields with the handwriting input on a preliminary basis using the locations of the handwriting input and the input fields. In certain embodiments, a predetermined number of nearest input fields are associated 604 with the handwriting input. In other embodiments, each input field within a predetermined distance of the handwriting input is associated 604 with the handwriting input. In further embodiments, multiple input fields are associated 604 with the handwriting input only when a distance between an additional input field and the handwriting input is within a predetermined percentage of the distance between the nearest input field and the handwriting input.

The context-aware recognition device queries 606 an application to which the input field belongs for metadata regarding the input field. If more than one input field is associated with the handwriting input, then the context-aware recognition device queries 606 an application for metadata regarding each associated input field. For example, if the handwriting input is associated with an input field of a web page, a web browser presenting the web page may be queried to obtain 606 the metadata. The metadata describes a property, characteristic, or format of input expected by the input field and may include a field descriptor, a field type, a tag corresponding to the input field, or the like.

Next, the context-aware recognition device determines 608 whether the query response provides sufficient data to identify a field type of a preliminarily associated input field. The metadata may be used to search a table or database which correlates metadata (or key terms) to field types. The input field type may indicate a category or format of input expected by the preliminarily associated input field. If the application provides sufficient data to identify the input field type responsive to the query, the context-aware recognition device proceeds to adjust 614 a handwriting recognition engine based on the field type. Otherwise, if the application does not provide sufficient data to identify the input field type responsive to the query, the context-aware recognition device proceeds to scan 610 for text adjacent to the input field.

In some embodiments, scanning 610 text adjacent to the input field includes accessing display data to locate and analyze text adjacent to the input field. For example, an input field may have a text box below it containing the word "address." The context-aware recognition device may identify that there is text adjacent to the input field, analyze the adjacent text to determine that it contains the word "address," In other embodiments, scanning 610 includes parsing code of the application to locate and analyze text adjacent to the input field.

The context-aware recognition device then identifies 612 a field type of each preliminarily associated input field based on the scan results. The scan results may be used to search a table or database which correlates metadata (or key terms) to field types. The input field type may indicate a category or format of input expected by the input field. In some embodiments, the scan results and the metadata are combined to identify 612 a field type for each preliminarily associated input field.

The context-aware recognition device then adjusts 614 a handwriting recognition engine based on the identified field type. Where two or more field types are identified, such as where a plurality of input fields are preliminarily associated with the handwriting input, the adjustment 614 may be based on all identified field types. In certain embodiments, adjusting 614 the handwriting recognition engine includes modifying a language model used by the handwriting recognition engine to select for text conforming to the categories and/or formats foreseen by the input field type. In certain embodiments, adjusting 614 the handwriting recognition engine includes modifying the handwriting recognition engine to preferentially select text from a list, table, or database related to the input field type. In certain embodiments, adjusting 614 the handwriting recognition engine includes adapting the handwriting recognition engine to avoid certain words, character combinations, or symbols when interpreting the handwriting input.

The context-aware recognition device then conclusively associates 616 the handwriting input with an input field based on the content of the handwriting input, as determined by the handwriting recognition engine. Imprecise placement of a finger, stylus, or digital pen may result in the handwriting input being closer to an input field other than the intended input field. In some embodiments, conclusively associating 616 the handwriting input with an input field includes calculating, for each nearby input field, a probability or likelihood that the recognized handwriting input matches an input field type. The handwriting input may then be conclusively associated 616 with an input field having the greatest likelihood.

In some embodiments, conclusively associating 616 the handwriting input with an input field includes searching the recognized handwriting input for characteristics or formats unique to the input field type. In certain embodiments, conclusively associating 616 the handwriting input with an input field, in one embodiment, also includes determine content of the handwriting input based on output from the handwriting recognition engine. The method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   an input device operatively coupled to the processor that receives, by user input, a handwriting input;
   a memory that stores code executable by the processor to:
   obtain metadata related to an input field associated with the handwriting input;
   identify a field type of the input field using the metadata; and
   increase a weight given by a handwriting recognition engine to text having properties associated with the identified field type.

2. The apparatus of claim 1, wherein the processor further queries an application for properties of the input field, wherein obtaining metadata related to the input field associated with the handwriting input comprises receiving one or more results of the query as metadata.

3. The apparatus of claim 1, wherein the processor further identifies text adjacent to the input field, wherein obtaining metadata related to the input field associated with the handwriting input comprises receiving the text as metadata.

4. The apparatus of claim 1, wherein the processor further associates the handwriting input with a particular input field using a field type of the particular input field and content of the handwriting input.

5. The apparatus of claim 4, wherein the processor identifies a plurality of input fields near a location of the handwriting input and associates the handwriting input with an input field having a field type related to content of the handwriting input.

6. The apparatus of claim 1, wherein the processor further associates the handwriting input with a particular input field using a location of the handwriting input.

7. The apparatus of claim 6, wherein associating the handwriting input with a particular input field using a location of the handwriting input comprises the processor:
   identifying the location of the handwriting input with respect to a plurality of input fields;
   calculating distances between the location of the handwriting input and each input field; and
   associating the handwriting input with a nearest one of the plurality of input fields.

8. The apparatus of claim 6, wherein associating the handwriting input with a particular input field using a location of the handwriting input comprises the processor:
   identifying a plurality of input fields that are located within a predetermined distance of the location of the handwriting input;
   analyzing content of the handwriting input; and
   selecting one of the plurality of input fields matching the content of the handwriting input.

9. The apparatus of claim 1, wherein the processor further provides an input suggestion from a contacts database in response to the input field type being one of: an email address field, an address field, a telephone number field, and a uniform resource locator field.

10. A method comprising:
    receiving handwriting input from an input device in response to user input;
    identifying, by use of a processor, a field type of an input field associated with the handwriting input;
    causing a handwriting recognition engine to use a language model specific to the identified field type; and
    increasing a weight given by the handwriting recognition engine to text having characteristics associated with the identified field type.

11. The method of claim 10, further comprising obtaining metadata related to the input field, wherein identifying a field type of the input field comprises identifying a field type using the metadata.

12. The method of claim 11, wherein obtaining metadata related to the input field comprises at least one action selected from the group consisting of: querying an application for a property of the input field and identifying text adjacent to the input field.

13. The method of claim 10, further comprising:
    calculating distances between the handwriting input and positions of a plurality of the input fields; and
    associating the handwriting input with each input field having a distance within a predetermined percentage of a distance between the handwriting input and a nearest input fields.

14. The method of claim 10, further comprising:
    calculating distances between the location of handwriting input and positions of a plurality of input fields; and
    associating the handwriting input with an input field in response to the distance being less than a predetermined threshold.

15. The method of claim 10, further comprising:
    comparing content of the handwriting input to the input field type; and
    associating the handwriting input with another input field in response to the content not matching the input field type.

16. The method of claim 10, further comprising:
    identifying a plurality of input fields that are located within a predetermined distance of each other;
    analyzing content of the handwriting input; and
    selecting one of the plurality of input fields matching the content of the handwriting input.

17. The method of claim 10, further comprising:
    providing provides an input suggestion from a contacts database in response to the identified field type being one of: an email address field, an address field, a telephone number field, and a uniform resource locator field.

18. A program product comprising a non-transitory computer readable storage medium that stores code executable by a processor to perform:
    receiving handwriting input;
    obtaining metadata related to an input field associated with the handwriting input;
    identifying a field type of the input field using the metadata; and
    increasing a weight given by a handwriting recognition engine to text having characteristics associated with the field type.

19. The program product of claim 18, further comprising associating the handwriting input with the input field using a location of the handwriting input.

20. The program product of claim 19, wherein associating the handwriting input with the input field comprises identifying a plurality of input fields near a location of the handwriting input and associating the handwriting input with an input field having a field type related to content of the handwriting input.

\* \* \* \* \*